Aug. 9, 1966   J. W. ATTWOOD   3,265,340
PIPE HANGERS
Filed June 1, 1965
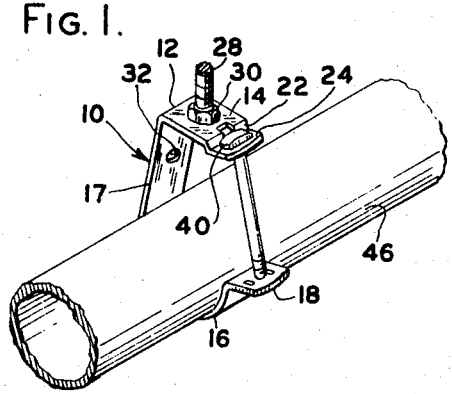
FIG. 1.
FIG. 6.
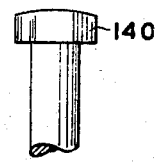
FIG. 5.
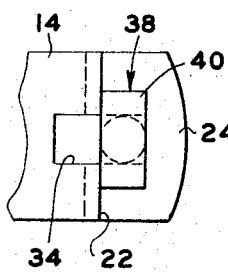
FIG. 4.
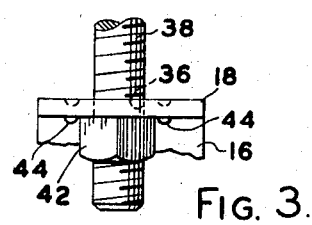
FIG. 3.
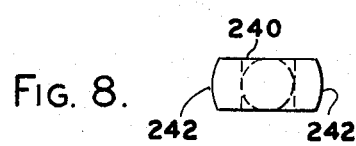
FIG. 8.
FIG. 7.
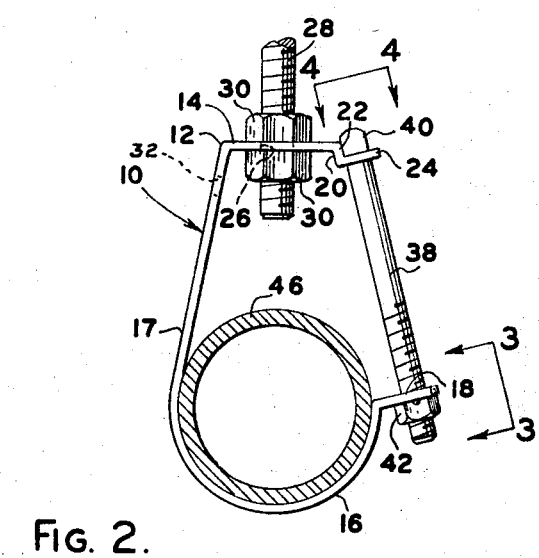
FIG. 2.
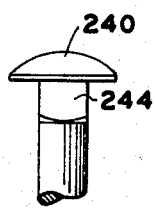
INVENTOR.
JAMES W. ATTWOOD
BY Hawke & Hawke
ATTORNEYS

United States Patent Office 3,265,340
Patented August 9, 1966

3,265,340
PIPE HANGERS
James W. Attwood, Wayne, Mich., assignor to Unistrut Corporation, Wayne, Mich., a corporation of Michigan
Filed June 1, 1965, Ser. No. 460,104
9 Claims. (Cl. 248—62)

The present invention relates to pipe hangers and more particularly to such supports or hangers adapted to be suspended from ceilings or other overhead structures.

Pipe hangers have been heretofore disclosed in which a strap of metal is bent to form a straight top portion and a curved bottom portion. The pipe is carried in the curved bottom portion of the hanger and a bolt extending between the bottom portion and the top portion is provided to receive a nut for locking the pipe in place.

Such a pipe hanger has been disclosed in U.S. Patent No. 2,616,645, issued to Harry L. and Orlin C. Kindorf on Nov. 4, 1952.

The present invention provides a pipe hanger similar to that disclosed in the Kindorf patent but which offers substantial advantages over the hanger therein disclosed. As will become more apparent as the description proceeds the advantages reside principally in a new means for locking the pipe in place. The locking means provides ease in positioning and locking the pipe in the hanger and insures that the pipe will not be accidentally disengaged from the hanger.

It is an object then of the present invention to provide a hanger which is simpler in use than prior hangers.

It is another object of the present invention to provide a hanger similar to those disclosed in the aforementioned Kindorf patent but which affords substantial advantages over such hangers by providing a new means for locking the pipe in place within the hanger.

It is another object of the present invention to improve such hangers by providing a new means for preventing pipes from becoming accidentally disengaged from the supported position.

Still further objects and advantages of the present invention will be readily apparent to one skilled in the art to which the invention pertains upon reference to the following drawings in which like reference characters refer to like parts throughout the several views and in which FIG. 1 is a perspective view of a hanger embodying the present invention and supporting a pipe.

FIG. 2 is a front elevational view of the hanger illustrated in FIG. 1 and illustrating the pipe in cross section.

FIG. 3 is a fragmentary elevational view as seen substantially from line 3—3 of FIG. 2 and enlarged somewhat for purposes of clarity.

FIG. 4 is a fragmentary elevational view as seen substantially from line 4—4 of FIG. 2 and enlarged somewhat for purposes of clarity.

FIG. 5 is a fragmentary elevational view of another preferred bolt for the hanger illustrated in FIGS. 1–4.

FIG. 6 is a top elevational view of the bolt shown in FIG. 5.

FIG. 7 is a fragmentary elevational view of still another preferred bolt for the hanger illustrated in FIGS. 1–4, and FIG. 8 is a top elevational view of the bolt shown in FIG. 7.

Now referring to the drawings for a more detailed description of the present invention a preferred pipe hanger is illustrated in FIGS. 1–2 as comprising a strap member 10 bent as at 12 to form a top portion 14 and having a curved lower portion 16 connected to the top portion 14 by a medial straight portion 17. The free end of the curved lower portion 16 is bent outwardly to form a straight lug portion 18. The free end of the top portion 14 is bent downwardly and outwardly as at 20 to form a shoulder portion 22 and a lug portion 24.

The top portion 14 is provided with a central hole 26 for receiving a threaded hanger rod 28. Nut members 30 are carried by the rod 28 on opposite sides of the top portion 14 to adjustably support the strap member 10. The threaded rod 28 is adapted to be connected by any suitable means (not shown) to a ceiling or other overhead structure from which the hanger is to be supported. A hole 32 may if preferred be provided in the medial portion 17 to provide a means for supporting the strap 10 against a vertical structure such as a wall or the like.

As can best be seen in FIG. 4 the top portion 14 is preferably provided with a rectangular opening 34 which extends through the shoulder portion 22 and into the lug portion 24. The opening 34 is disposed with its longitudinal axis substantially normal to the plane of the shoulder portion 22 and is substantially bisected by the shoulder portion 22 as shown in FIG. 4.

The lug portion 18 is provided with a perforation 36 which is adapted to receive the threaded free end of a bolt member 38. The bolt member 38, as can best be seen in FIG. 4, is provided with a rectangular head portion 40 dimensioned to be received by the rectangular opening 34 when the longitudinal axis of the opening 34 and the head portion 40 are aligned and to be engaged in the seat formed by the shoulder portion 22 and the upper face of the lug portion 24 when the bolt member 38 is rotated a quarter of a turn to bring the longitudinal axis of the head portion 40 substantially normal to the longitudinal axis of the rectangular opening 34. A nut member 42 is provided for the bolt member 38. As can best be seen in FIG. 3, the nut member 42 is adapted to be tightened against the lower face of the lug portion 18 and a pair of projections 44 are formed on opposite sides of the perforation 36 preferably by dimpling the upper surface of the lug portion 18. The projections 44 are spaced to be engaged by the corner edges of the nut member 42 upon rotation of the nut member 42.

The lower portion 16 of the strap member 10 is curved on a radius to support in cradle-like fasion a pipe or conduit 46.

To mount the hanger of the present invention in a supporting position the assembly including the bolt member 38 and the nut member 42 are mounted in position to suspend from the threaded rod 28. The nut member 42 is then loosened sufficiently to permit the bolt member 38 to be moved axially upwardly so that the head portion can be rotated above the shoulder portion 22. The bolt member 38 is then rotated one quarter of a turn to bring the head portion 40 of the bolt member 38 into alignment with the rectangular opening 34. When this is accomplished the bolt member 38 then can be moved axially downwardly to disengage the bolt member 38 from the lug portion 24. The bolt member 38 will remain connected to the strap member 10, however, since the head portion 40 prevents passage of the bolt member 38 through the circular opening 36 provided in the lug portion 18. The pipe or conduit 46 is then moved through the space between the lug portions 24 and 18 and is positioned within the lower portion 16. With the pipe member 46 in the proper position the bolt member 38 is moved axially upwardly and is rotated to permit passage of the head portion 40 through the rectangular opening 34. The bolt member 38 is rotated one quarter of a turn again to permit the head portion 40 to drop into the seat formed by the shoulder portion 22 and the top face of the lug portion 24. Tightening the nut member 42 then securely locks the pipe 46 in a supported position.

The shoulder portion 22 prevents the head portion 40 of the bolt member 38 from rotating so that only a single tool is needed to assemble the hanger and to mount the pipe member 46 in a supported position. The shoulder portion 22 also prevents the bolt member 38 from accidentally disengaging from the lug portion 24 since to do so it is necessary to move the bolt member axially upwardly to bring the head portion 40 above the shoulder portion 22. Further, the projections 44 also prevent the bolt member 38 from becoming accidentally disengaged from the strap 10 by insuring that the nut member 32 cannot be accidentally loosened. Engagement of the corner edges of the nut member 42 with the projections 44 tend to prevent the nut member 42 from backing off of the bolt member 38 if the hanger is subjected to vibrations or other stresses which would tend to loosen the nut member 42.

FIGS. 5, 6, 7 and 8 illustrate two other head portions which could be provided for the bolt member 38 if desired. In FIGS. 5 and 6 the head portion 140 is of an oval shape rather than the rectangular shape as illustrated in the embodiment of FIGS. 1–4. In FIGS. 7 and 8 the head portion 240 is substantially rectangular but is provided with arcuate lateral edges 242. The shank of the bolt adjacent the head portion 240 may be squared if desired as shown at 244.

It is apparent that the pipe hanger of the present invention is much easier to mount in the supporting position than other previously known similar hangers in that it can be mounted to the supporting structure as a single assembly. The bolt member 38 remains connected to the strap 10 even as the pipe 46 is being installed within the hanger and therefore cannot become lost. Further, the hanger of the present invention is much easier to mount than the hanger of the aforementioned Kindorf patent. Due to the weight of the pipe member 46 and the resiliency of the strap 10 it is usually necessary to support the pipe member 46 with one hand while the locking means are installed with the other hand. With the structure disclosed in the aforementioned Kindorf patent, this is difficult because the bolt member must be inserted through the perforations provided in the lug portions and held in place while the nut member is tightened. In the hanger of the present invention, however, the bolt member 38 can be easily axially moved with one hand and rotated to a temporary locking position. Once it is in this position, the hand holding the pipe member 46 can be released and the nut member 42 tightened.

It is also apparent that although I have described but one embodiment of my invention many changes and modifications can be made therein without departing from the spirit of the invention as expressed by the appended claims.

I claim:

1. A pipe hanger comprising
   (a) a resilient strap member having a top portion and a curved lower portion,
   (b) one end of said top portion being separated from one end of said lower portion and means for lockingly connecting said ends,
   (c) said means comprising an opening provided in said top portion adjacent said end thereof, an opening provided in said lower portion adjacent said end thereof, a bolt member having a head portion dimensioned to be axially inserted through one of said openings at one rotated position of said bolt member and to be locked against axial movement through said last mentioned opening in one direction at other rotated positions thereof, the end of said bolt member opposite said head portion being received by said other opening and a nut member carried on said end of said bolt member.

2. The pipe hanger as defined in claim 1 and in which said head portion is elongated in one direction normal to the axis of said bolt and said head portion receiving opening is elongated in one direction.

3. The pipe hanger as defined in claim 1 and in which said head portion is substantially rectangular in top plan view and said head portion receiving opening is substantially rectangular.

4. The pipe hanger as defined in claim 1 and in which the end receiving said opposite end of said bolt member is provided with projections engaging said nut member upon rotation thereof.

5. The pipe hanger as defined in claim 1 and in which said head portion receiving end is provided with a shoulder defining a seat for receiving said head portion at said locked rotated position thereof and said shoulder engaging said head portion to prevent rotation of said bolt member when said head portion of said bolt member is positioned within said seat.

6. A pipe hanger comprising
   (a) a resilient strap member having a straight top portion, a curved lower portion and straight medial portion connecting said top portion to said lower portion,
   (b) one end of said top portion being separated from one end of said lower portion,
   (c) said top portion end being bent downwardly and then outwardly to define a shoulder portion and a lug portion,
   (d) an elongated opening being provided in said top portion and extending through said shoulder portion and said lug portion,
   (e) a bolt member having a head portion dimensioned to be axially received by said opening at one rotated position of said bolt member and to be locked against said shoulder portion and against axial movement through said opening at another rotated position of said bolt member, and
   (f) an opening provided in the end of said lower portion for receiving the free end of said bolt member and a nut member carried by said free end.

7. The pipe hanger as defined in claim 6 and in which,
   (a) said end of said lower portion being bent outwardly to form a lug portion,
   (b) said last mentioned opening being provided in said last mentioned lug portion, and
   (c) projections being formed on the underside of said last mentioned lug portion to engage the corner edges of said nut member upon tightening thereof.

8. The pipe hanger as defined in claim 6 and in which said first mentioned opening is substantially rectangular and said shoulder portion substantially bisects said rectangular opening.

9. The pipe hanger as defined in claim 8 and in which said head portion is substantially rectangular in a plane substantially normal to the axis of said bolt member.

References Cited by the Examiner

UNITED STATES PATENTS

| 2,616,645 | 11/1952 | Kindorf et al. | 248—62 |
| 2,998,217 | 8/1961 | Englis et al. | 248—74 |
| 3,167,286 | 1/1965 | Sherburne | 248—62 |

CLAUDE A. LE ROY, *Primary Examiner.*